United States Patent [19]

Lenhart

[11] 3,746,207

[45] July 17, 1973

[54] EMERGENCY TELEPHONE BOX

[75] Inventor: Robert L. Lenhart, Royal Oak, Mich.

[73] Assignee: W. D. Gale, Inc., Troy, Mich.

[22] Filed: June 14, 1971

[21] Appl. No.: 152,502

[52] U.S. Cl. ............... 220/36, 16/110 R, 174/52 R, 220/18, 220/55.7

[51] Int. Cl. ............................................ B65d 43/16

[58] Field of Search ............... 220/18, 35, 36, 94 R, 220/55.3, 55.7; 174/48.50, 52 R; 16/110 R, 126

[56] References Cited

UNITED STATES PATENTS

| | | | |
|---|---|---|---|
| 1,283,749 | 11/1918 | Hauer | 220/35 |
| 1,673,693 | 6/1928 | McLelland | 220/35 |
| 2,766,465 | 10/1956 | Radzik | 220/35 |

FOREIGN PATENTS OR APPLICATIONS

| | | | |
|---|---|---|---|
| 1,028,874 | 5/1953 | France | 220/36 |
| 21,755 | 0/1914 | Great Britain | 220/55.7 |

*Primary Examiner*—George E. Lowrance
*Attorney*—L. Gaylor Hulbert et al.

[57] ABSTRACT

An emergency telephone box comprising a box body mounted on a pole, a cover pivotally connected to the body of the box by hinge means, a coiled torsion door spring nonmovably secured at one end to the side of the box body and movably secured at the other end to the inside surface of the cover for resiliently holding the cover of the telephone box closed, and a handle secured to a cam member, which cam member is adapted to engage a projection provided within the box body on pivoting the handle to force open the cover under severe icing conditions.

8 Claims, 7 Drawing Figures

Patented July 17, 1973 3,746,207

3 Sheets-Sheet 1

INVENTOR
ROBERT L. LENHART

BY Whittemore
Hulbert & Belknap
ATTORNEYS

INVENTOR.
ROBERT L. LENHART
BY
ATTORNEYS

INVENTOR
ROBERT L. LENHART

BY Whittemore Hulbert & Belknap

ATTORNEYS

EMERGENCY TELEPHONE BOX

BACKGROUND OF THE INVENTION

1. Field of the Invention

The invention relates to telephone boxes and refers more particularly to emergency telephone boxes for use on expressways and the like having a pivotally connected cover which is biased closed by unique spring means and including cam means secured to the box handle whereby the box can be easily opened under severe icing conditions.

2. Description of the Prior Art

Because most emergency telephone boxes are located out of doors, they are vulnerable to icing conditions which occur with the onset of cold weather. In the past, emergency telephone box doors have sometimes been frozen shut so that they could be opened only with a great deal of difficulty, which is undesirable.

In addition, some thoughtless users of emergency telephone equipment in the past have left telephone boxes open after use, exposing the equipment to the elements wherein the equipment is located outdoors. Exposure of this equipment to the elements is detrimental thereto so that spring-biased telephone box covers have been used in some installations. However, the spring-biasing structure of the past has not been entirely satisfactory in providing required ruggedness and degree of bias with the box cover both opened and closed.

SUMMARY OF THE INVENTION

The emergency telephone box of the present invention is intended for use on limited access superhighways or the like. A telephone box, housing a special telephone circuit which is not part of the present invention, is intended to be placed every half mile or mile along the highway so that a stranded motorist will only have to walk a short distance to a telephone to summon aid.

The present invention consists of an emergency telephone box with a cover pivotally connected to the body of the box by hinge means. A handle and cam member assembly is provided to allow opening of the cover under severe icing conditions. Unique spring structure is provided to insure that the cover will remain closed when the telephone box is not in use.

To allow the telephone box cover to be easily opened, even under extreme icing conditions when the cover may be frozen shut, a special handle and cam assembly is provided. The handle consists of a lever portion adapted to extend vertically on the exterior of the box and a horizontally extending portion with a circular opening therethrough near the bottom of the lever portion. The cam comprises an elongated central portion, a cam portion on one end of the central portion, and a circular portion with a circular opening running laterally therethrough at the opposite end of the central portion. The handle and cam assembly are rigidly connected by means of a pivot pin, said pin passing through and engaged with the respective circular openings provided in the handle and cam. The pivot pin is rotatably seated in a boss structure extending outwardly from and integral with the cover of the box. A raised surface adapted to be engaged by the cam on pivoting of the lever is provided on the inside of the box adjacent the free edge of the cover.

To open the cover, an outwardly directed force is applied to the lever of the handle forcing the handle down and thereby causing the cam to engage the raised surface on the interior of the box.

The cover is prevented from being left open inadvertently or blown open by the wind by means of a spring provided near the hinged end of the cover, which biases the cover in a closed direction. The spring is fixed at one end to the inside of the telephone box in a fixed position and is provided with an elongated loop at the other end through which a headed fastening member secured to the cover is passed whereby relative movement is provided between the other end of the spring and the headed fastening member on opening of the telephone box cover. A coiled portion is provided on the spring adjacent the one end thereof for providing a spring force, and an offset is provided between the coiled portion and the other end of the spring for clearing the hinged edge of the telephone box on opening the telephone box. With the spring of the invention, the telephone box cover is maintained closed with a substantial spring force which is maintained relatively uniform over substantially the entire opening swing of the telephone box cover.

DESCRIPTION OF THE PREFERRED EMBODIMENTS

Figures 1, 2, 3:
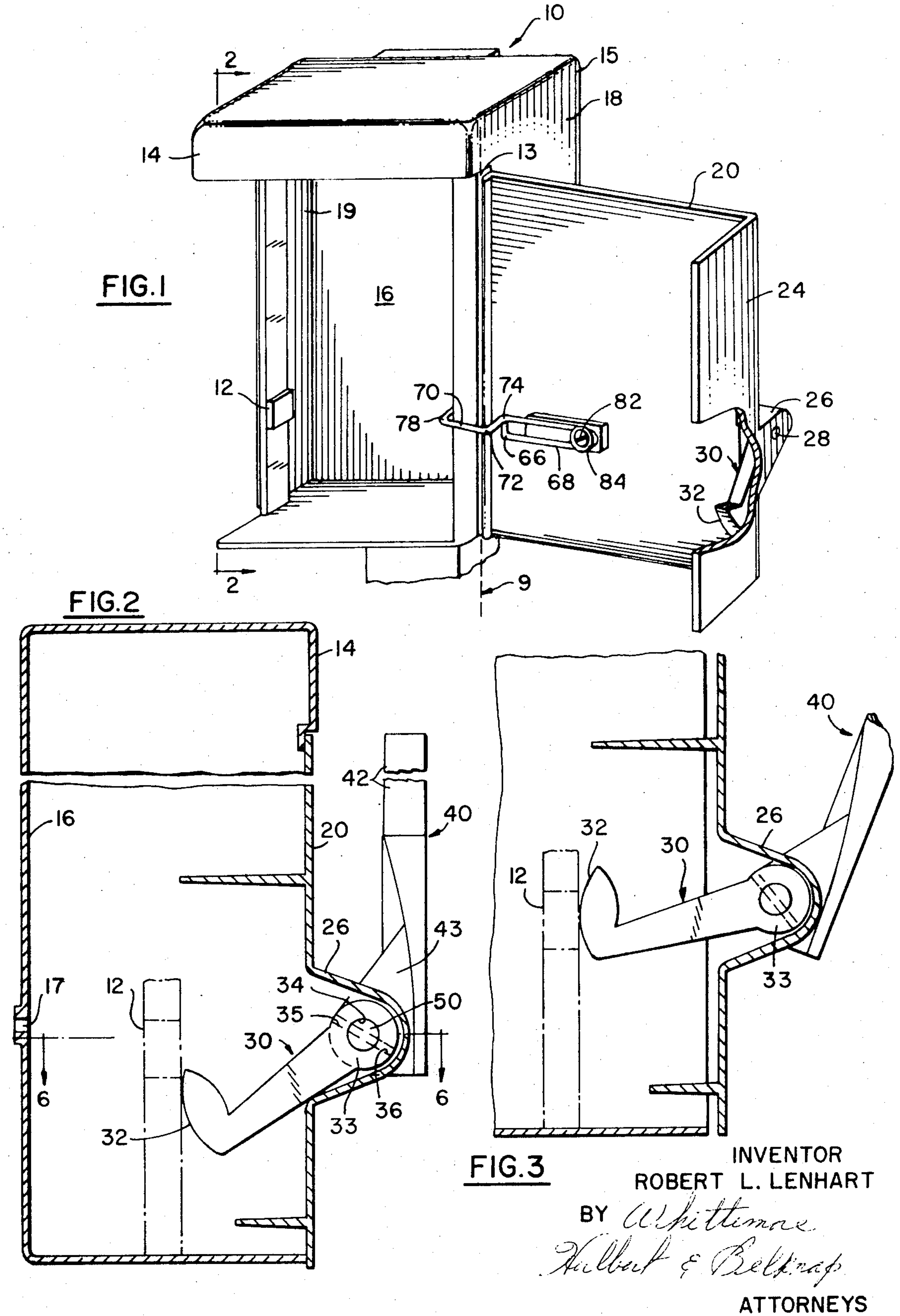
FIG. 1 is a partly broken away perspective view showing the emergency telephone box, cover spring and handle and cam assembly of the present invention.
FIG. 2 is an enlarged section view of the emergency telephone box illustrated in FIG. 1, showing the cover in a closed position, taken substantially on line 2—2 of FIG. 1.
FIG. 3 is a broken partial section view similar to the section view of FIG. 2 and showing the cover in a partially open position.

The emergency telephone box of the present invention, generally designated in FIG. 1 by the reference numeral 10, is intended to be secured to a pole 11 or the like by means of screws, bolts or the like inserted through the openings 17 provided in the rear wall 16 of the box.

The telephone box consists of a body 15, to one side 18 of which is pivotally connected a cover 20 by hinge means 13 for pivoting about the axis 9. The cover 20 has at its free edge a lateral extension 24 which is adapted to fit against the short side 19 of the box. A boss 26 is provided at the free edge of the cover 20.

Figure 4:
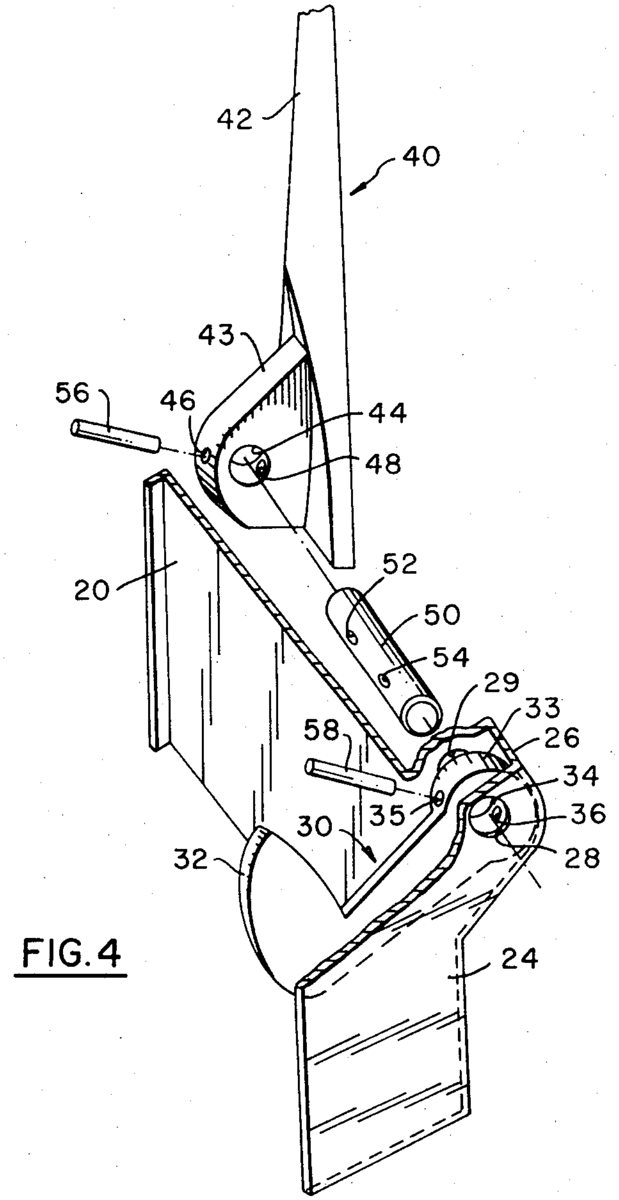
FIG. 4 is an enlarged exploded perspective view of the handle and cam assembly of the telephone box illustrated in FIG. 1.

The box 26, as best shown in FIG. 4, has a hollow interior and has two holes 28 and 29 extending laterally therethrough. The circular end portion 33 of the cam 30 is adapted to fit into the hollow interior of the boss 26. The end portion 33 has one hold 34 running laterally therethrough and two smaller holes 35 and 36 extending radially therethrough.

A pivot pin 50, whicb extends through the openings 28 and 29 of the boss and through the hole 34 of the cam 30 which is located in the interior of the boss, is pivotally supported in the boss 26. The cam 30 is rigidly connected to the pivot pin 50 by the pin 58 which is inserted through the holes 35 and 36 of the circular end portion 33 of the cam 30 and the corresponding radial opening 54 in the pivot pin 50 in alignment with the two openings 35 and 36. At its other end exterior of the boss 26 and the cover 20, the pivot pin 50 is inserted into the laterally extending hole 44 of the portion 43 of the handle 40. The pin 50 is rigidly locked to the handle 40 by means of pin 56 inserted through the radially extending openings 46 and 48 of the portion 43 of the handle and the corresponding radial opening 52 in the pin 50.

Thus, the handle 40 and the cam 30 are connected by pivot pin 50 which is rigidly secured to both the handle 40 and cam 30 by pins 56 and 58. The pin 50 extends through the boss 26. The cam 30 extends into the interior of the boss to engage the pin 50 inside of the cover, while the handle 40 engages the pin 50 at one side of the boss 26 exterior of the cover with the elongated portion 42 thereof extending upwardly of the boss and parallel to the cover 20.

A projection 12 is located inside the body 15 of the telephone box 10 adjacent the edge of side 19. The cam portion 32 of the cam 30 is adapted to engage the projection 12 on pivoting of the handle 40 about pivot pin 50, as shown in FIG. 3, to force the cover open. Thus, the cover 20 of the emergency telephone box 10 may be easily opened even under severe icing conditions. That is to say, the cam 30 acts as an ice breaker when the cover is frozen shut.

To insure that the cover 20 of the telephone box 10 will not be left open accidentally or be blown open by the wind or the like, thereby exposing the telephone mechanism within to the elements, the spring 60 is provided to urge the cover closed at all times.

Figure 5:
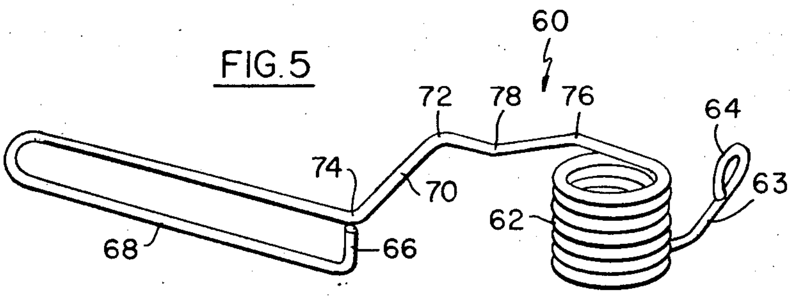
FIG. 5 is an enlarged perspective view of the cover spring of the telephone box illustrated in FIG. 1.

As previously indicated, the spring 60 includes the coiled portion 63, an end 63 having a loop 64 formed therein, and an end 66 having the elongated loop 68 formed therein. The portion 70 of the spring 60 between the coiled portion 62 and the elongated loop 68 is offset by the portion 70 having the right angle bends 72 and 74 and the lesser angle bends 76 and 78 therein, all as shown in FIG. 5.

Figure 6:
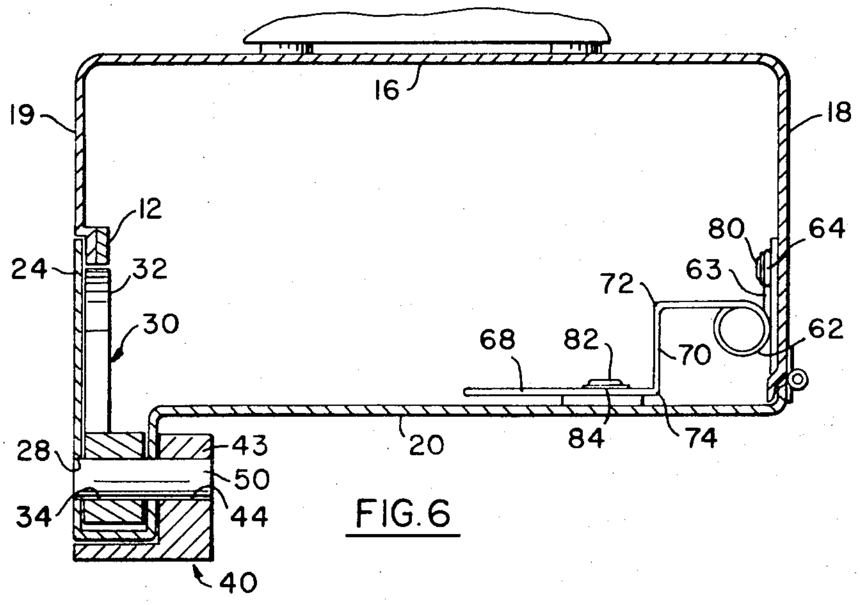
FIG. 6 is an enlarged section view of the telephone box illustrated in FIG. 1, showing the handle and cam assembly and the cover spring of the telephone box with the cover in a closed position, taken substantially on line 6—6 in FIG. 2.

In installation, as shown best in FIG. 6, the end 63 of the spring 60 is secured in a fixed position within the box body 15 on wall 18 by convenient means such as the screw 80 extending through the loop 64 and into the wall 18. The other end 66 of the spring 60 is secured to the cover 20 of the telephone box 10 for movement relative thereto by means of the headed mounting member 84 and screw 82 passing through the elongated loop 68 of the spring 60 into the cover 20.

Figure 7:
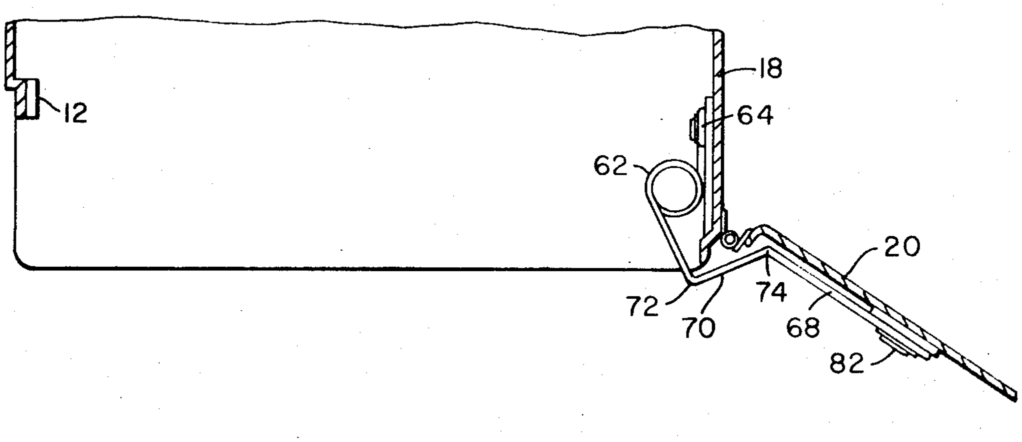
FIG. 7 is similar to the lower portion of FIG. 6 and shows the telephone box cover in a partially open position with the corresponding change in spatial arrangement of the cover spring.

In operation, as shown best in FIG. 7, when the cover 20 is pivoted about the pivot means 13 to open the telephone box 10, the spring 60 will be deformed as shown whereby the offset portion 70 permits clearance of the edge of the side 18 of the telephone box body 15 by offset portion 70 of the spring 60. In addition, the spring force urging the cover 20 closed on opening of the cover 20 is maintained relatively uniform on movement of the elongated loop 68 past the headed mounting member 84. Thus, exceptional force is not necessary to maintain the telephone box cover 20 in a fully open position, and adequate force is provided to maintain the cover closed under relatively strong wind conditions.

While one embodiment of the emergency telephone box invention has been considered in detail, it will be understood that other embodiments and modifications are contemplated. It is the intention to include all embodiments and modifications as defined by the appended claims within the scope of the invention.

What I claim as my invention is:

1. An emergency telephone box comprising a box body, a cover pivotally attached at one edge to said box body and having a free opposite edge, a handle and cam, assembly secured to the cover adjacent the free edge thereof cooperable with the box body for forcing the cover open comprising a handle located on the outside of the cover and a cam located on the inside of the cover, means for rigidly securing the handle and cam together for pivotal movement about an axis parallel to the plane of the cover and resilient means secured to the telephone box between the box body and cover for biasing the cover closed.

2. Structure as set forth in claim 1 wherein the means for securing the handle and cam of the handle and cam assembly together for pivotal movement about an axis parallel to the plane of the cover comprises a hollow boss in the cover at the other edge thereof in which one end of the cam is received including openings extending therethrough parallel to the plane of the cover and a pivot pin extending through one end of the lever, the openings through the boss and through the one end of the cam for rotation in the boss and means rigidly securing the one end of the lever and the one end of the cam to the pivot pin.

3. Structure as set forth in claim 1 wherein the resilient means biasing the cover closed comprises a spring having a first looped end secured to the box body adjacent the one edge of the cover in a fixed position, a coil portion adjacent the one end of the spring for providing spring force, an offset portion between the coil portion and the other end of the spring whereby the spring clears the box body at the one edge of the cover on opening the cover, and means for securing the other end of the spring to the cover for movement relative thereto on opening of the cover comprising an elongated loop formed in the other end of the spring and a headed fastening member passing through the elongated loop and secured to the cover.

4. The structure as set forth in claim 1 wherein a projection is provided on the inside of the box body adjacent the free edge of the cover whereby on pivoting the handle and cam assembly the projection is engaged by the cam to force the cover open.

5. A box for housing an emergency telephone or the like comprising a box body, a cover pivotally attached at one edge to said box body having a free opposite edge, a hollow boss in the cover at the free edge thereof, a handle and cam assembly including a handle on the outside of the cover and a cam on the inside of the cover, and means for rigidly securing the handle and cam together for pivotal movement about an axis parallel to the plane of the cover and a projection within the box body adjacent the free edge of the cover whereby on pivoting of the handle and cam assembly the cam engages the projection to force the cover open.

6. Structure as set forth in claim 5 wherein the means for securing the handle and cam of the handle and cam assembly together for pivotal movement about an axis parallel to the plane of the cover comprises a hollow boss in the cover at the other edge thereof in which one end of the cam is received including openings extending therethrough parallel to the plane of the cover and a pivot pin extending through one end of the lever, the openings through the boss and through the one end of the cam for rotation in the boss and means rigidly securing the one end of the lever and the one end of the cam to the pivot pin.

7. A box for housing an emergency telephone or the like comprising a box body, a cover pivotally attached at one edge to said box body and resilient means connected to the box body and cover for biasing the cover closed with a substantially uniform force with the cover closed and in substantially any open position thereof comprising a spring one looped end of which is rigidly secured to the box body adjacent the one edge of the cover, and including a coil portion adjacent the one end thereof, an offset portion between the coil portion and other end of the spring for clearing the edge of the box body adjacent the one edge of the cover on opening the cover, and means for securing the other end of the spring to the cover for movement relative thereto on opening of the cover comprising an elongated loop formed in the other end of the spring and a headed fastening member passed through the elongated loop and secured to the cover.

8. A box for housing an emergency telephone or the like comprising a box body, a cover pivotally attached at one edge to said box body having a free opposite edge, a projection on the inside of the box body adjacent the free edge of the cover, a handle and cam assembly comprising a handle located on the outside of the cover and a cam located on the inside of the cover, and means for rigidly securing the handle and cam together for pivoted movement about an axis parallel to the plane of the cover whereby on pivoting the handle and cam assembly the projection is engaged by the cam to force the cover open, and resilient means connected to the box body and cover for biasing the cover closed comprising a spring one looped end of which is rigidly secured to the box body adjacent the one edge of the cover, and including a coil portion adjacent the one end thereof and an offset portion between the coil portion and the other end of the spring for clearing the edge of the box body adjacent the one edge of the cover on opening the cover and an elongated loop formed in the other end of the spring for securing the other end of the spring to the cover for movement relative thereto on opening of the cover.

* * * * *